United States Patent
Huang et al.

(10) Patent No.: US 12,415,136 B2
(45) Date of Patent: Sep. 16, 2025

(54) MODEL TRAINING METHOD AND APPARATUS, STORAGE MEDIUM, AND DEVICE

(71) Applicant: TENCENT TECHNOLOGY (SHENZHEN) COMPANY LIMITED, Shenzhen (CN)

(72) Inventors: Chao Huang, Shenzhen (CN); Like Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1144 days.

(21) Appl. No.: 17/335,037

(22) Filed: May 31, 2021

(65) Prior Publication Data

US 2021/0295099 A1 Sep. 23, 2021

Related U.S. Application Data

(63) Continuation of application No. PCT/CN2020/089981, filed on May 13, 2020.

(30) Foreign Application Priority Data

May 21, 2019 (CN) .......................... 201910423433.0

(51) Int. Cl.
*A63F 13/67* (2014.01)
*G06F 18/214* (2023.01)
(Continued)

(52) U.S. Cl.
CPC ............ *A63F 13/67* (2014.09); *G06F 18/214* (2023.01); *G06F 18/22* (2023.01); *G06F 18/23* (2023.01);
(Continued)

(58) Field of Classification Search
None
See application file for complete search history.

(56) References Cited

U.S. PATENT DOCUMENTS 10,289,509 B2 * 5/2019 Xu ...................... G06F 11/2263
2018/0150769 A1 * 5/2018 Ahuja .................... G06N 20/00
(Continued)

FOREIGN PATENT DOCUMENTS

CN 106874934 A 6/2017
CN 106874956 A 6/2017
(Continued)

OTHER PUBLICATIONS

Nguard: A Game Bot Detection Framework for NetEase MMORPGs: https://dl.acm.org/doi/pdf/10.1145/3219819.3219925), Tao et al., (Year: 2018).*

(Continued)

*Primary Examiner* — Haimei Jiang
(74) *Attorney, Agent, or Firm* — ANOVA LAW GROUP PLLC

(57) ABSTRACT

A model training method and apparatus, a storage medium, and a device, relating to the field of artificial intelligence (AI) technologies are provided. The method includes: obtaining a plurality of training samples, each training sample including an interaction screen and an action label, the action label indicating an interaction action adopted by a character object in the interaction screen; extracting features from the interaction screens included in the plurality of training samples, and performing clustering according to the extracted features, to obtain a clustering result; determining at least one key sample from the plurality of training samples according to the clustering result; and setting a weight for each training sample, and updating a network parameter of a deep network based on the plurality of training samples with the weights, the weight of each key sample being
(Continued)

greater than the weight of another sample in the plurality of training samples.

18 Claims, 10 Drawing Sheets

(51) Int. Cl.
  *G06F 18/22* (2023.01)
  *G06F 18/23* (2023.01)
  *G06N 3/08* (2023.01)
  *G06V 10/762* (2022.01)
  *G06V 10/82* (2022.01)
  *G06V 20/00* (2022.01)

(52) U.S. Cl.
  CPC ............ *G06N 3/08* (2013.01); *G06V 10/763* (2022.01); *G06V 10/82* (2022.01); *G06V 20/00* (2022.01)

(56) References Cited

U.S. PATENT DOCUMENTS

| | | | | |
|---|---|---|---|---|
| 2019/0114544 | A1* | 4/2019 | Sundaram | G06F 18/2155 |
| 2020/0228359 | A1* | 7/2020 | el Kaliouby | H04L 67/131 |
| 2021/0086089 | A1* | 3/2021 | Pardeshi | G06N 3/04 |

FOREIGN PATENT DOCUMENTS

| | | | |
|---|---|---|---|
| CN | 107291232 | A | 10/2017 |
| CN | 108805259 | A | 11/2018 |
| CN | 109107161 | A | 1/2019 |
| CN | 109376757 | A | 2/2019 |
| CN | 109445662 | A | 3/2019 |
| CN | 109464803 | A | 3/2019 |
| CN | 109499068 | A | 3/2019 |
| CN | 110119815 | A | 8/2019 |

OTHER PUBLICATIONS

The World Intellectual Property Organization (WIPO) International Search Report for PCT/CN2020/089981 Aug. 19, 2020 6 Pages (including translation).

The State Intellectual Property Office of the People's Republic of China (SIPO) Office Action 1 for for 201810423433.0 Sep. 27, 2020 12 pages (including translation).

Shuling Li, "Research on Multi-label Algorithm of Improved RBF Neural Network," China Excellent Master's Thesis Full-text Database Information Technology Series, Issue 9, Chapter 4, Sep. 15, 2014. 11 pages.

Dong Shan et al., "Multi-label Learning Model Based on Multi-label Radial Basis Function Neural Network and Regularized Extreme Learning Machine", Pattern recognition and artificial intelligence, vol. 30, No. 9, Sep. 30, 2017, pp. 833-840. 8 pages.

\* cited by examiner

MODEL TRAINING METHOD AND APPARATUS, STORAGE MEDIUM, AND DEVICE

RELATED APPLICATIONS

This application is a continuation application of PCT Patent Application No. PCT/CN2020/089981, entitled "MODEL TRAINING METHOD AND APPARATUS, STORAGE MEDIUM, AND DEVICE" and filed on May 13, 2020, which claims priority to Chinese Patent Application No. 201910423433.0, filed with the National Intellectual Property Administration, PRC on May 21, 2019 and entitled "MODEL TRAINING METHOD AND APPARATUS, STORAGE MEDIUM, AND DEVICE", the entire contents of both of which are incorporated herein by reference.

FIELD OF THE TECHNOLOGY

The present disclosure relates to the field of artificial intelligence (AI) technologies, and in particular, to a model training method and apparatus, a storage medium, and a device.

BACKGROUND OF THE DISCLOSURE

AI is emerging science and technology researched and developed currently for simulating, extending, and expanding human intelligence. At present, the AI technology has been widely applied to many scenarios such as a game scenario.

Game AIs focus on game experience brought by the AI technology to a player, to enable a game to present an intelligent behavior or activity similar to a human intelligent behavior or activity, or present characteristics conforming to thinking or perception of a player. That is, a game AI can intelligently simulate a real player through imitation learning to play a game.

For a game scenario, intelligent simulation focuses on training of an algorithm model, which is also referred to as an AI model herein, and further improves game experience of a player by applying the trained AI model to a real game scenario. As well known, an adequate AI model can improve a game effect greatly. For this purpose, how to train a model becomes an urgent problem to be resolved by a person skilled in the art.

SUMMARY

According to embodiments provided in the present disclosure, a model training method and apparatus, a storage medium, and a device are provided, to improve a model training effect. The technical solutions are as follows.

According to one aspect, a model training method is provided and is applicable to a computer device. The method includes: obtaining a plurality of training samples, each training sample including an interaction screen and an action label, the action label indicating an interaction action adopted by a character object in the interaction screen; extracting features from the interaction screens included in the plurality of training samples, and performing clustering according to the extracted features, to obtain a clustering result; determining at least one key sample from the plurality of training samples according to the clustering result; and setting a weight for each training sample, and updating a network parameter of a deep network based on the plurality of training samples with the weights, the weight of each key sample being greater than the weight of another sample in the plurality of training samples.

According to another aspect, a model training apparatus is provided, including: an obtaining module, configured to obtain a plurality of training samples, each training sample including an interaction screen and an action label, the action label indicating an interaction action adopted by a character object in the interaction screen; a feature extraction module, configured to: extract features from the interaction screens included in the plurality of training samples, and perform clustering according to the extracted features, to obtain a clustering result; a selection module, configured to determine at least one key sample from the plurality of training samples according to the clustering result; a setting module, configured to set a weight for each training sample; and a training module, configured to update a network parameter of a deep network based on the plurality of training samples with the weights, the weight of each key sample being greater than the weight of another sample in the plurality of training samples.

According to another aspect, one or more non-transitory storage media storing computer-readable instructions are provided, the computer-readable instructions, when executed by one or more processors, causing the one or more processors to perform: obtaining a plurality of training samples, each training sample including an interaction screen and an action label, the action label indicating an interaction action adopted by a character object in the interaction screen; extracting features from the interaction screens included in the plurality of training samples, and performing clustering according to the extracted features, to obtain a clustering result; determining at least one key sample from the plurality of training samples according to the clustering result; and setting a weight for each training sample, and updating a network parameter of a deep network based on the plurality of training samples with the weights, the weight of each key sample being greater than the weight of another sample in the plurality of training samples.

According to another aspect, a computer device is provided, including a memory and a processor, the memory storing computer-readable instructions, the computer-readable instructions, when executed by the processor, causing the processor to perform: obtaining a plurality of training samples, each training sample including an interaction screen and an action label, the action label indicating an interaction action adopted by a character object in the interaction screen; extracting features from the interaction screens included in the plurality of training samples, and performing clustering according to the extracted features, to obtain a clustering result; determining at least one key sample from the plurality of training samples according to the clustering result; and setting a weight for each training sample, and updating a network parameter of a deep network based on the plurality of training samples with the weights, the weight of each key sample being greater than the weight of another sample in the plurality of training samples.

Details of one or more embodiments of the present disclosure are provided in the accompanying drawings and descriptions below. Other features, objectives, and advantages of the present disclosure become apparent from the specification, the accompanying drawings, and the claims.

BRIEF DESCRIPTION OF THE DRAWINGS

To describe the technical solutions in the embodiments of the present disclosure more clearly, the accompanying drawings required for describing the embodiments are briefly described hereinafter. Apparently, the accompanying drawings in the following descriptions show merely some embodiments of the present disclosure, and a person of ordinary skill in the art may obtain other accompanying drawings according to these accompanying drawings without creative efforts.

DESCRIPTION OF EMBODIMENTS

Figure 1:
FIG. 1 is a schematic diagram of an interaction screen according to an embodiment of the present disclosure.

To make the objectives, technical solutions, and advantages of the present disclosure clearer, the following further describes implementations of the present disclosure in detail with reference to the accompanying drawings.

AI is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline and relates to a wide range of fields including both hardware-level technologies and software-level technologies. The basic AI technologies generally include technologies such as a sensor, a dedicated AI chip, cloud computing, distributed storage, a big data processing technology, an operating/ interaction system, and electromechanical integration. AI software technologies mainly include several major directions such as a computer vision (CV) technology, a speech processing technology, a natural language processing technology, and machine learning (ML)/deep learning.

The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional (3D) object reconstruction, a 3D technology, virtual reality, augmented reality, synchronous positioning, and map construction, and further include biological feature recognition technologies such as common face recognition and fingerprint recognition.

ML is an interdisciplinary field and relates to a plurality of disciplines such as the probability theory, statistics, the approximation theory, convex analysis, and the algorithm complexity theory. The ML specializes in studying how a computer simulates or implements a human learning behavior to obtain new knowledge or skills, and reorganize an existing knowledge structure, so as to keep improving performance of the computer. The ML, as the core of AI, is a basic way to make the computer intelligent, and is applicable to various fields of AI. ML and deep learning generally include technologies such as an artificial neural network, a belief network, reinforcement learning, transfer learning, inductive learning, and learning from demonstrations.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of the present disclosure relate to technologies such as CV and ML of AI, and are specifically described by using the following embodiments.

Before the embodiments of the present disclosure are explained and described in detail, some terms involved in the embodiments of the present disclosure are explained and described first.

Schematically, game AI is a technology that allows a game developer to create attractive game experience for a player. In other words, regardless of what kind of means is adopted, as long as it can give a player a degree of intelligence to make the game more attractive, more challenging, and more interesting, it can be regarded as game AI. That is, game AI is not to achieve a maximum success rate and is not designed only for victory but also for creating better game experience for a player.

A deep network is also referred to as a deep neural network and is referred to as DNN for short.

The DNN is the basis for deep learning. The concept of deep learning originates from research in human neural networks and is a method based on characterizing and learning data in ML. In other words, deep learning is a new field in ML research. A motivation of deep learning is to establish a neural network that simulates a human brain for analysis and study.

In short, a lightweight deep network is a small DNN that is small in network scale and is suitable for a mobile terminal such as a smartphone or an embedded device.

A main design purpose of a lightweight deep network is to minimize network scale (for example, a quantity of parameters and a calculation amount) while ensuring particular network precision.

In an example, one of the most direct design purposes of the lightweight deep network is to apply the lightweight deep network to a mobile terminal such as a smartphone, so that the mobile terminal also has AI computing power.

A depth feature is a feature finally obtained by extracting a feature from an image by using a DNN and includes abstract information of the image.

A player is also referred to as a user in the embodiments of the present disclosure.

The player may also be referred to as a gamer, which is a term used in the gaming industry and among game participants. Broadly speaking, the player is generally a user who plays games, that is, anyone who participates in a game in any form.

In particular, in a role-playing game, players usually play controllable roles in a game world, and control such controllable roles to complete to the game or customized goals. In addition, some players may further be leading roles or key roles in a game plot in a role-playing game.

In summary, players are experiencers, users, evaluators, and consumers of a game. According to differences in personality and preferences, different players prefer different types of games.

In the embodiments of the present disclosure, an interactive activity is a general term for games of any types.

A character object may also be referred to as a game character, a game person, or a player character. In the embodiments of the present disclosure, the character object is a character or an object controlled by a player in a game.

For a clustering algorithm in the embodiments of the present disclosure, cluster analysis, also referred to as group analysis, is a statistical analysis method for studying the classification of samples or indicators and is also an important algorithm for data mining.

Cluster analysis is formed by several modes. Generally, a mode is a vector of a metric or a point in a multi-dimensional space. Cluster analysis is based on similarities, and there are more similarities between modes in one cluster than modes that are not in one cluster.

A mobile game is usually a game application running on a mobile terminal.

In the embodiments of the present disclosure, a mobile terminal installed with a mobile game is also referred to as a mobile game terminal.

A mobile game terminal is a mobile terminal device on which a mobile game runs. Schematically, the mobile game terminal is usually a smart phone, a tablet computer, or the like.

In the embodiments of the present disclosure, an action label is annotated data obtained by manually annotating a game action. The game action herein is an action performed by a game character or a game object appearing in a game screen.

In the embodiments of the present disclosure, a game sample includes at least one frame of game screen image and a game action adopted by a character object in a game state displayed by a current game screen image.

The game screen is usually generated by a game application in a computer device and displayed by using a display module (such as a display screen) in the computer device. The computer device may be a smartphone, a tablet computer, or an ebook reader. Alternatively, the computer device may be a notebook computer or a stationary computer. This is not specifically limited in the embodiments of the present disclosure. By using a mobile game running on a mobile terminal as an example, the computer device is specifically a mobile terminal. Correspondingly, the computer device may also be referred to as a mobile game terminal.

In the embodiments of the present disclosure, a significant sample is also referred to as a key sample and may be a sample that plays a key role in a game result. For example, the significant sample is a game sample in which a specific game action needs to be performed in a specific game state. In other words, the significant sample may be a sample corresponding to a game screen image in which a character object needs to perform a specific game action.

In an example, referring to a game screen image shown in FIG. 1, the game screen image indicates a specific game state. That is, a cliff or a gap appears in front of a game person. In such a game state, to obtain coins and prevent the game person from falling, a jump action needs to be taken.

Figure 2:
FIG. 2 is a schematic diagram of another interaction screen according to an embodiment of the present disclosure.

In some game states, regardless of what game action the game person takes, a game ending may not be adversely affected. For example, referring to FIG. 2, in a game state in which the game person walks on the flat ground, the game person may take any game action and has no adverse impact on a game ending. For such a sample, an action label of the sample is not fixed. During the training of a game AI, if a weight of such a sample is set to be the same as that of a significant sample, a model training direction will deviate, and a better training effect cannot be achieved.

Based on the above, the embodiments of the present disclosure provide an imitation learning method based on a significant sample during training of the game AI. In the method, first, game samples are obtained through game recording, and therefore, the training can be performed without any interaction with a game environment. Such an offline training method can accelerate the training of the game AI. In addition, a significant sample during the game recording can also be selected, and the impact of the significant sample on a network parameter is enhanced. That is, by using such an imitation learning method, when a few game samples are obtained by recording the game, a significant sample is automatically selected from the game samples. In addition, a higher weight is given for the significant sample during the training, so that a game AI effect is improved.

A sample other than the significant sample in the game samples may also be referred to as a common sample herein.

Based on the above, in one embodiment of the present disclosure, during the training of the game AI, by using the ML method, the following effects can be achieved by selecting a significant sample during game recording and performing imitation learning based on the significant sample.

First, a significant sample corresponding to a key moment in a game process is selected, and a higher weight is given to the significant sample during the training, to make the weight of the significant sample higher than that of a common sample, so that the impact of the significant sample on a network parameter can be enhanced, and the impact of the common sample with lower significance on the network parameter is reduced, thereby achieving a better game AI effect.

Second, in the embodiments of the present disclosure, game samples for a specific game are obtained through game recording. Because such a method is an offline training method and does not require any interaction with a game environment, a model can converge within a relatively short time. That is, the training of a game AI can be accelerated in a manner of obtaining game samples through game recording.

An implementation environment of a model training method provided in the embodiments of the present disclosure is described below.

Figure 3:
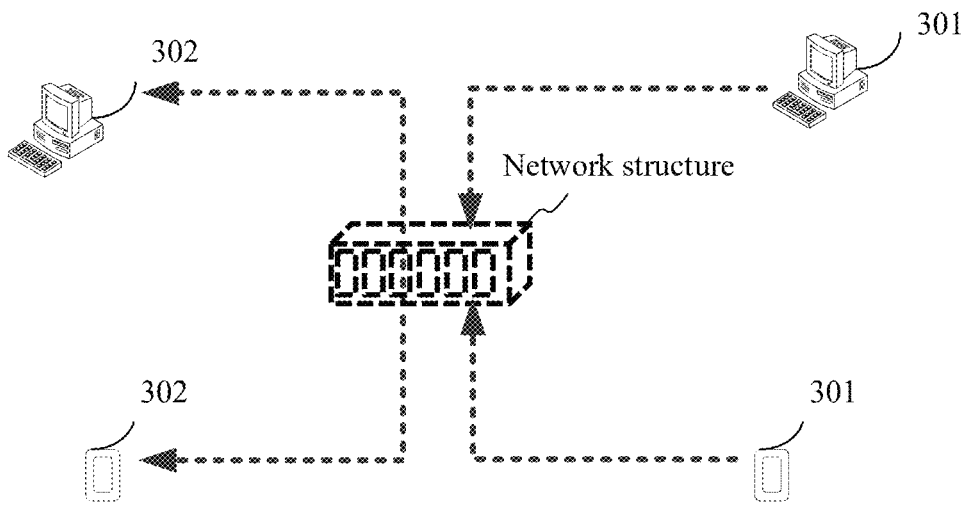
FIG. 3 is a schematic diagram of an implementation environment of a model training method according to an embodiment of the present disclosure.

Referring to FIG. 3, the implementation environment includes a model training device 301 and a model application device 302.

At a stage of AI model training, the model training device 301 finishes imitation learning that is based on a significant sample and trains a game AI, which mainly includes three stages as follows:

First, the model training device 301 records a game to obtain samples of a plurality of rounds of games for a specific game. A game sample includes a frame of game screen image and a corresponding action label.

Subsequently, the model training device 301 extracts a depth feature of a game screen image in each game sample by using a pretrained deep network, and classifies, by using a clustering method, the extracted depth features into a plurality of types; and next, counts a quantity of action labels appearing in each type. If action labels corresponding to game samples in a type are highly consistent, the game samples in the type are significant samples in a game process, and the significant samples correspond to key moments in a game.

Conversely, if there are a large quantity of action labels corresponding to game samples in a type, it indicates that various game actions may be taken in such a game state. The game samples in the type are not significant samples in the game process and the game samples do not correspond to key moments in the game.

During imitation learning training, the model training device 301 increases weights of the significant samples, so that the significant samples have greater impact on a network parameter. The impact of samples with lower significance on the network parameter is reduced, and weights of such game samples are reduced. In other words, the model training device 301 can extract the significant samples generated during game recording, and further give higher weights to the significant samples when training a game AI, so as to enhance the impact of such samples on the network parameter and obtain a game AI with a better training effect.

In a possible implementation, the model training device 301 and the model application device 302 may be computer devices having a capability of ML. For example, the computer device may be a personal computer, a tablet computer, a notebook computer, a smartphone, or the like. This is not specifically limited in the embodiments of the present disclosure.

In an example, the model training device 301 and the model application device 302 may be the same device. Alternatively, the model training device 301 and the model application device 302 may be different devices. Moreover, when the model training device 301 and the model application device 302 are different devices, the model training device 301 and the model application device 302 may be devices of the same type. For example, the model training device 301 and the model application device 302 may both be smartphones. Alternatively, the model training device 301 and the model application device 302 may be devices of different types. For example, the model training device 301 may be a smartphone, and the model application device 302 may be a personal computer. This is not specifically limited in the embodiments of the present disclosure.

After the model training device 301 trains a game AI, the model application device 302 can simulate a real player to play a game by using the trained game AI.

In an example, as shown in FIG. 3, the model application device 302 may be a mobile terminal such as a smartphone or a tablet computer. The model application device 302 is installed with a game application that may provide a game scene, and the game application usually requires a server to provide backend support. A player may control a character object of the player in the game scene by using the model application device 302.

Different game AIs may be trained for games of different types. In other words, the model training method provided in the embodiments of the present disclosure is applicable to various games, as long as the model training device 301 obtains game samples of games of different types to perform model training.

The model training method provided in the embodiments of the present disclosure is described below in detail.

In addition, the terms "first", "second", "third", "fourth", and the like described below are intended to distinguish between similar objects but do not constitute any other limitation.

Figure 4:
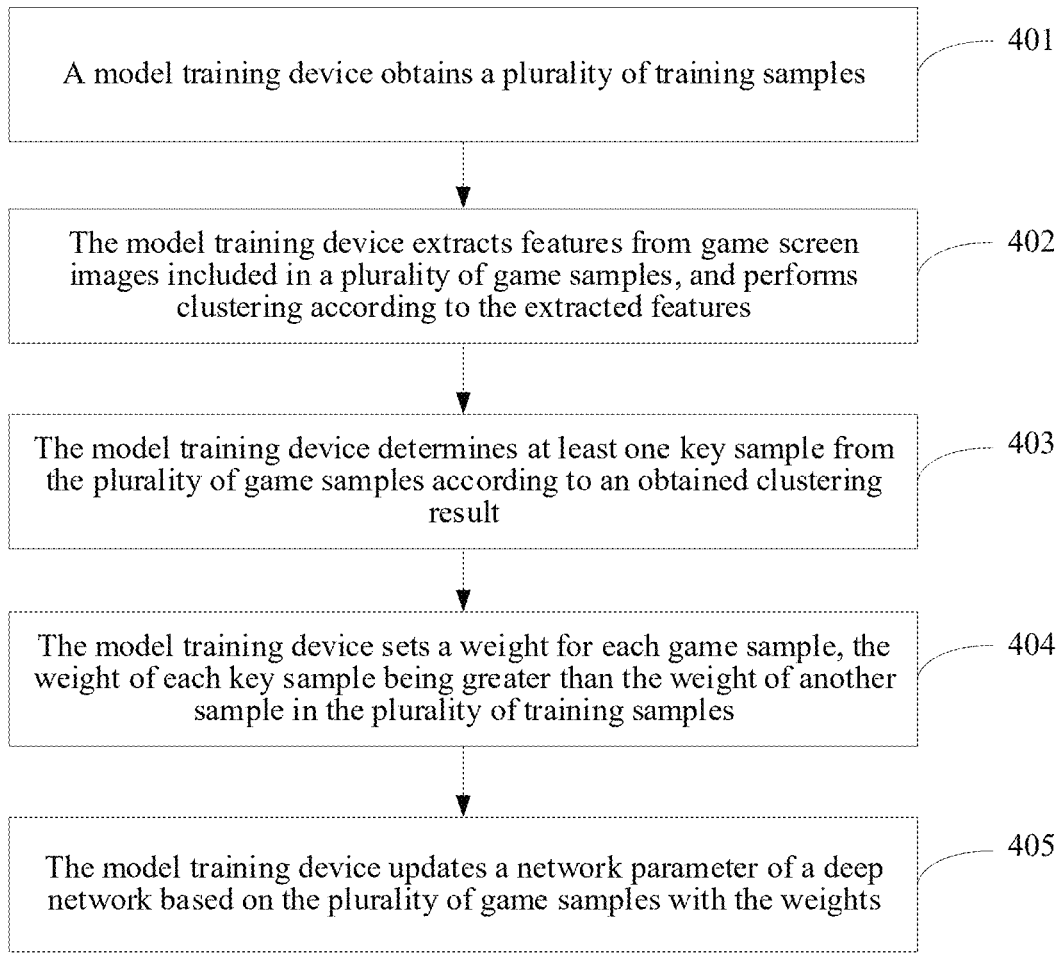
FIG. 4 is a flowchart of a model training method according to an embodiment of the present disclosure.

FIG. 4 is a flowchart of a model training method according to an embodiment of the present disclosure. By using training of a game AI as an example, referring to FIG. 4, a method procedure provided in one embodiment of the present disclosure includes:

401. A model training device obtains a plurality of training samples.

In one embodiment of the present disclosure, the training samples are obtained through game recording. That is, a currently displayed game process is recorded during running of a target game program to obtain the plurality of game samples.

In a possible implementation, short-time game recording may be performed through manual triggering. For example,
when it is detected that the target game program starts, a currently displayed game process is recorded immediately. Alternatively, when a manually-triggered game recording instruction is received in a game process, a currently displayed game process is recorded. This is not specifically limited in this embodiment of the present disclosure.

In an example, a game interface may display a game recording button. When it is detected that a user triggers the button, it is determined that a game recording instruction is received, and game recording is started. In addition, after the recording is started, the recording may be paused by triggering the button again.

In addition, because the duration of one round is relatively short for many games, in order to acquire sufficient game samples, a plurality of rounds of games may be recorded in one embodiment of the present disclosure. That is, samples of the plurality of rounds of games are obtained for a game.

In a possible implementation, a recording parameter may be further set during the game recording. The recording parameter includes, but is not limited to, a recording frequency, or the like. In an example, the recording frequency may be set to 10 frames per second. This is not specifically limited in this embodiment of the present disclosure.

Figure 5:
FIG. 5 is a schematic diagram of another interaction screen according to an embodiment of the present disclosure.
Figure 6:
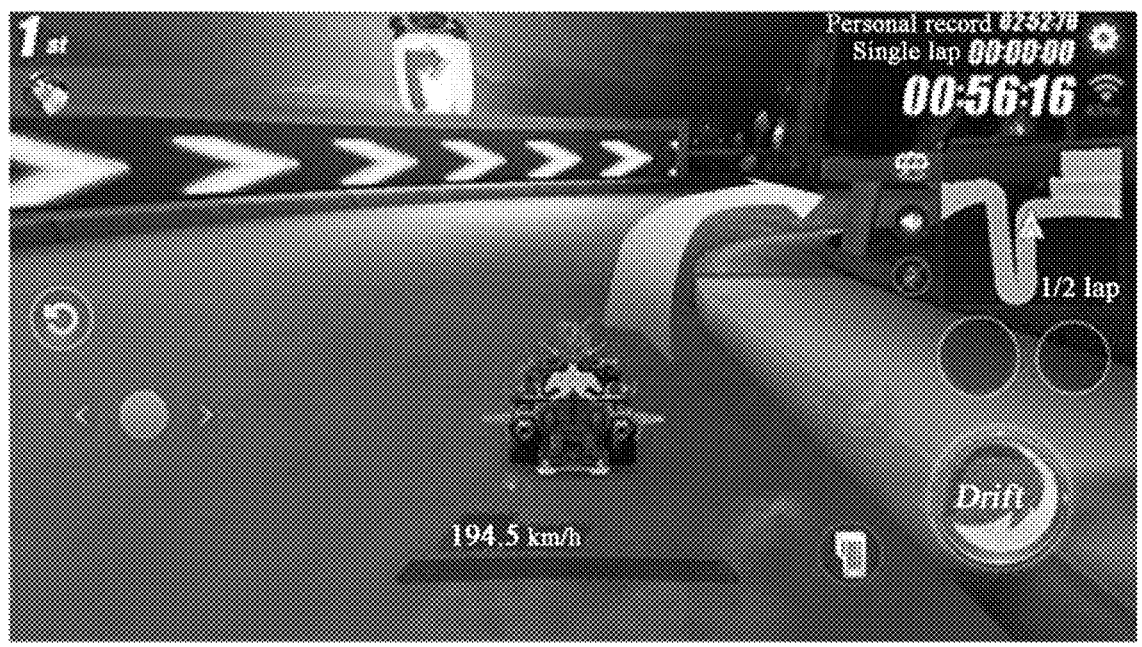
FIG. 6 is a schematic diagram of another interaction screen according to an embodiment of the present disclosure.
Figure 7:
FIG. 7 is a schematic diagram of another interaction screen according to an embodiment of the present disclosure.

During game recording, different game actions are recorded for different games. That is, recorded game actions are related to game types. For example, referring to FIG. 5 to FIG. 7, for a car racing game, recorded game actions are usually a left movement, a right movement, and a drift, and for a parkour game, recorded game actions are usually a squat and a jump. In addition, the combination of action buttons may be further defined as a new game action. For example, an act of simultaneously pressing a left-movement button and a drift button in a car racing game is defined as a left drift action.

In one embodiment of the present disclosure, in the game recording process, a game screen image and the corresponding game action are retained. The game action is represented in the form of an action label in the game samples.

In other words, each game sample includes a game screen image and a corresponding action label, and the action label indicates a game action adopted by the character object in the game screen image. The game screen image reflects a current game state.

During the game recording, there is usually a large difference between sample quantities corresponding to different game actions. To prevent a trained AI model from favoring a specific game action, a recorded sample is further resampled in one embodiment of the present disclosure to ensure that a sample quantity corresponding to each game action exceeds a threshold. The threshold is also referred to as a second threshold herein.

The sample recorded before the resampling is referred to as an initial sample herein, and the plurality of game samples herein are samples used for training a game AI after the sampling is completed.

The recording a currently displayed game process to obtain a plurality of game samples includes the following steps:

4011. Record a currently displayed interaction process based on a target duration to obtain initial samples. In some embodiments, the currently displayed interactions may be interactions played by real user player(s). In some embodiments, the currently displayed interactions may be interactions configured by a game administrator or a game designer.

The value of the target duration may be 30 min. This is not specifically limited in this embodiment of the present disclosure.

4012. Resample the initial samples to obtain the plurality of game samples for training an AI model. A sample quantity corresponding to each game action in the plurality of game samples is greater than the second threshold.

In a possible implementation, for a value setting manner of the second threshold, reference may be made to the following rule: The second threshold is set based on 1/C. That is, a proportion of a sample quantity corresponding to the each game action is 1/C. C is a total quantity of game actions during the game recording.

402. The model training device extracts features from game screen images included in a plurality of game samples, and performs clustering according to the extracted features.

In one embodiment of the present disclosure, the model training device usually extracts the features from the game screen images based on a pretrained network model. The network model is different from a deep network shown in FIG. 8 and is used for extracting depth features from the game screen images for a subsequent clustering process.

The network model may be pretrained based on a large-scale database. The large-scale database may come from a public network data set. The network model may be a convolutional neural network (CNN). This is not specifically limited in this embodiment of the present disclosure.

In a possible implementation, during the clustering of the extracted features, a K-means algorithm may be used as a clustering algorithm. The K-means algorithm is also referred to as a K-means clustering algorithm and is a clustering analysis algorithm of iterative solving. K in K-means is a quantity of classes or clusters, and means is a mean of data objects in a class or a cluster (such a mean is a description of a class center or a cluster center). In short, the K-means algorithm is a classification-based clustering algorithm that uses a distance as a measure of similarities between data objects. That is, when data objects have a smaller distance, the data objects have higher similarity and are more likely to be in the same class or cluster. The K-means algorithm includes the following clustering steps:

First, K data objects are randomly selected as initial cluster centers, a distance between each other data object and each cluster center used as a seed is then calculated, and the each other data object is allocated to the closest cluster center. A cluster center and data objects allocated to the cluster center represent a cluster. Each time a data object is allocated, the cluster center of the cluster is recalculated based on existing data objects in the cluster. This process is repeated continuously until a particular end condition is met. The end condition includes, but is not limited to: no data object is reallocated to different clusters, or no cluster center changes again, and an error sum of squares is locally minimum.

In one embodiment of the present disclosure, the data objects are the extracted features of the game screen images. A quantity of clustered types may be set based on experience. For example, the game samples may be clustered into 10 types by using the K-means algorithm. That is, the game screen images included in the game samples are clustered into 10 types. This is not specifically limited in this embodiment of the present disclosure.

403. The model training device determines at least one key sample from the plurality of game samples according to an obtained clustering result. In some embodiments, at least one key sample is determined for each of the clusters obtained in the clustering result.

The key sample herein may also be referred to as a significant sample. For example, the key sample is a sample corresponding to a game screen image in which a specific game action needs to be taken.

In the game process, in most cases, any game action has no adverse impact on a game result. Given that these samples bring more gain to the model training and because an appearance difference between different samples in these samples is very small, if the significant sample and the common sample are not distinguished and the same weights are set for the significant sample and the common sample, the AI model deviates and is difficult to converge. Therefore, after the game samples are obtained in step 401, a significant sample further needs to be extracted first based on the clustering algorithm during the game recording.

In a possible implementation, the determining a significant sample from the plurality of game samples according to an obtained clustering result includes, but is not limited to, the following steps:

4031. Count a quantity of action labels included in each clustered type.

For this step, counting the quantity of action labels means counting a quantity of game actions corresponding to each type. The game samples are clustered based on the clustering result, and therefore, based on the action labels of the game samples corresponding to a type, a total quantity of game actions corresponding to the type can be determined.

In an example, assuming that action labels in a type include a jump action and a squat action, there are two action labels.

4032. Determine, for any clustered type, a game sample corresponding to the type as the significant sample when the quantity of action labels included in the type is less than a first threshold.

In this step, if action labels corresponding to a type are relatively consistent, a game sample corresponding to the type is determined as a significant sample in the game process. In an example, the value of the first threshold may be 1. That is, game actions included in the type are unique, and the key sample is a sample corresponding to a game screen image in which a specific game action needs to be taken. This is not specifically limited in this embodiment of the present disclosure. For example, only a jump action is included.

404. The model training device sets a weight for each game sample, the weight of each key sample being greater than the weight of another sample in the plurality of training samples.

The way of setting a weight may be set as required. For example, the weight of the key sample may be set as a first weight, and the weight of another sample, that is, a common sample, may be set as a second weight. The first weight is greater than the second weight, and a specific value may be set as required. For example, the first weight may be 1, and the second weight may be 0.5.

In some embodiments, the plurality of training samples are clustered into at least two types according to the clustering result. A quantity of action labels included in each of the at least two types may be counted. For any type, a weight of a training sample corresponding to the type is determined according to the quantity of action labels included in the type, the quantity of action labels included in the type being negatively correlated with the weight.

Negative correlation is that two variables change in different directions. When one variable decreases, the other variable increases. It can be understood that, the negative correlation herein is that the variables change in different directions, and it is not required that one variable change when the other variable changes a little. For example, when the quantity of action labels is 1 or 2, the weight may be set to 1, and when the quantity of action labels is 3 to 8, the weight may be set to 0.8.

In one embodiment of the present disclosure, the model training device may set a weight for each game sample in the following manner: for any clustered type, the reciprocal of a quantity of action labels included in the type is determined as a weight of a game sample corresponding to the type.

In an example, assuming that a quantity of action labels corresponding to game samples in one type is N, weights of these game samples are set to 1/N. The value of N is a positive integer.

Because a quantity of action labels included in a type corresponding to the significant sample is less than a quantity of action labels included in a category corresponding to a common sample, after the weight is set for each game sample in the foregoing manner, the weight of the significant sample is certainly greater than that of the common sample.

405. The model training device updates a network parameter of a deep network based on the plurality of game samples with the weights.

Figure 8:
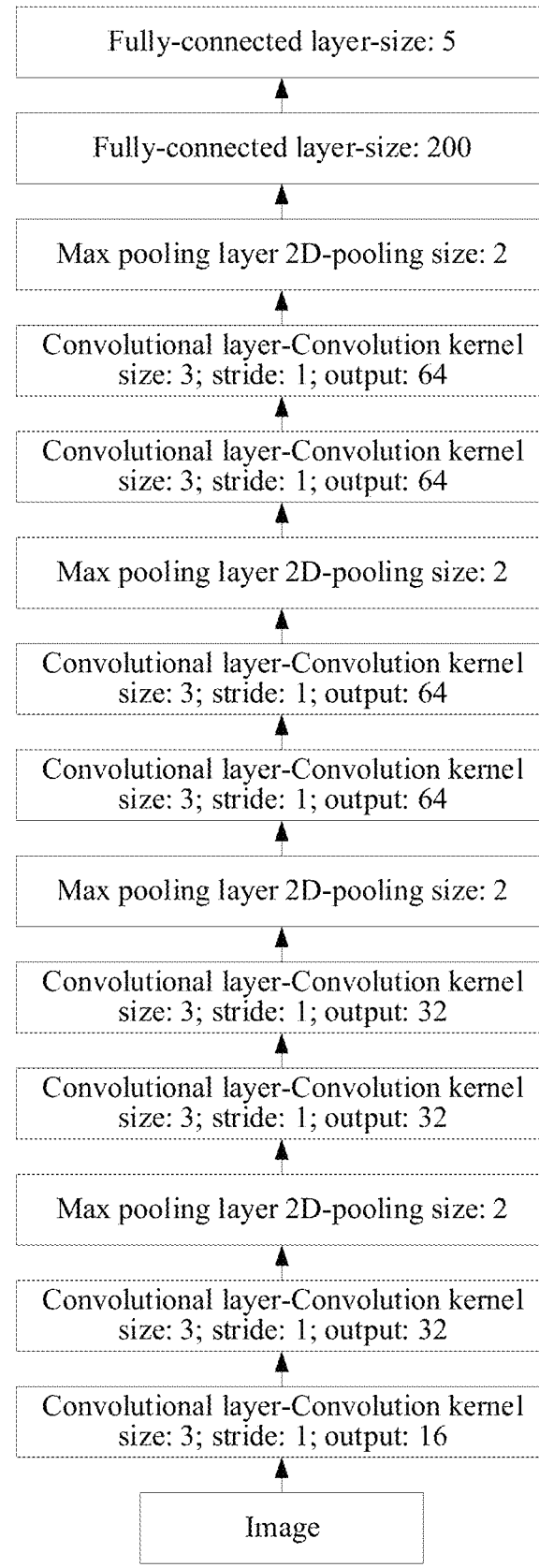
FIG. 8 is a schematic structural diagram of a deep network according to an embodiment of the present disclosure.

For any game sample with a weight, the model training device trains the deep network shown in FIG. 8 by using an interaction screen (that is, a game image) included in the game sample as an input of the deep network and by using an action label as a consideration for optimizing the deep network. During the training of the deep network, the significant sample is given a weight higher than that of the common sample. Therefore, the impact of the important sample on the network parameter in the network update process is enhanced, and the impact of the common sample on the network parameter is weakened.

During the training of the deep network, the weight is used for affecting an obtained loss value. When the weight is higher, the impact on the loss value is greater. That is, when the loss value is calculated, the impact of a model output result of a training sample with a large weight is more important. Therefore, when the network parameter is updated in a direction of decreasing the loss value, the training sample with a large weight has greater impact on the network parameter. For example, during the training, the model outputs an action prediction result corresponding to a training sample. Based on a difference between an action label and the action prediction result and a weight corresponding to the training sample, a loss value is calculated, and the network parameter is adjusted according to the loss value. The loss value may be positively correlated with the difference between the action label and the action prediction result. That is, when the difference is larger, a loss value is larger. The loss value is positively correlated with the weight corresponding to the training sample.

In a possible implementation, the updating a network parameter of a deep network based on the plurality of game samples with the weights includes, but is not limited to, the following steps:

4051. For any game sample, extract a specific region in a game screen image included in the game sample, and scale the extracted image region, to obtain a first image of a preset size.

In an example, the model training device selects a region in which an action can be distinguished in the game screen image. That is, the specific region is a region in which an action can be distinguished herein. This is not specifically limited in this embodiment of the present disclosure.

In an example, alternatively, the specific region may be directly used as the first image.

In a possible implementation, a region in which an action can be distinguished is usually a surrounding region of a character object in the game screen image. For example, a region having a particular range with the location of the character object as the center is clustered as a specific region. The size of the specific region may be set manually. This is not specifically limited in this embodiment of the present disclosure.

The preset size may be 150*150 pixels. That is, the extracted image region is scaled to 150*150 pixels, and the image of 150*150 pixels is then inputted into the deep network shown in FIG. 8.

4052. Input the image of the preset size into the deep network to obtain an action prediction result outputted by the deep network.

In order to speed up the network training and reduce computer resources consumed by the network, a lightweight deep network is used in one embodiment of the present disclosure. As shown in FIG. 8, a lightweight network structure includes eight convolutional layers (convolution), four pooling layers (MaxPooling) and two fully-connected layers.

The outputted action prediction result is a posterior probability that is given by the deep network and is of performing each game action in a corresponding game screen image.

4053. Determine, based on a loss function corresponding to the game sample, whether an actual game action included in the game sample matches an estimated action provided by the action prediction result.

In one embodiment of the present disclosure, a loss function with a weight is set for each game sample. In an example, the loss function may be a cross-entropy loss function with a weight. This is not specifically limited in this embodiment of the present disclosure. A formula of the loss function is as follows:

$$loss = w \sum_{i=1}^{C} y_i \log(\hat{y}_i),$$

where w indicates a weight of the game sample, C indicates a total quantity of game actions, i indicates an action type, the value of i is 1 to C, $y_i$ indicates whether a game action included in the game sample is of an $i^{th}$ type, $\hat{y}_i$ indicates a posterior probability that is outputted by the deep network and is of performing an action of the $i^{th}$ type in a game screen image included in the game sample, the value of w is 0 to 1, the value of C is a positive integer, and loss indicates a calculated loss value.

The estimated action provided by the foregoing action prediction result is a game action corresponding to a maximum posterior probability. This is not specifically limited in this embodiment of the present disclosure.

In addition, in one embodiment of the present disclosure, the impact of the significant sample on the network parameter can be enhanced based on the loss function with a weight.

4054. Iteratively update the network parameter of the deep network continuously when an actual game action does not match the estimated action, until the deep network converges.

The actual game action is a game action indicated by an action label included in the game sample. The mismatch between the actual game action and the estimated action may be that a difference between the actual game action and the estimated action is greater than a preset difference. For example, a calculated model loss value is greater than a preset threshold.

In an example, the network parameter may be updated iteratively in a gradient backward pass manner. This is not specifically limited in this embodiment of the present disclosure.

The method provided by one embodiment of the present disclosure at least has the following beneficial effects:

In one embodiment of the present disclosure, game samples for a game are obtained through game recording. Because such a method is an offline training method and does not require any interaction with a game environment, the deep network can converge within a relatively short time. That is, in a manner of obtaining game samples through game recording, the training of a game AI can be accelerated.

In addition, in one embodiment of the present disclosure, after the game samples are obtained, depth features of the game samples are extracted, and extracted depth features are clustered. Further, a significant sample corresponding to a key moment in a game process is selected according to a clustering result, and a higher weight is given to the significant sample during the training, to make the weight of the significant sample higher than that of a common sample, so that the impact of the significant sample on a network parameter can be enhanced, and the impact of the common sample with lower significance on the network parameter is reduced, thereby achieving a better game AI effect.

Based on the above, according to the imitation learning manner that is based on a significant sample and provided by one embodiment of the present disclosure, the weight of the significant sample on the model training can be increased, so that the deep network can learn more distinguishable abstract features, and the deep network obtained after learning can have a better game effect in a game process.

In another embodiment, after the deep network shown in FIG. 8 is trained, a test can be performed based on the trained deep network. A test process may be performed on an AI model test device. This is not specifically limited in this embodiment of the present disclosure. In a test phase, for a specific game, a game screen image reflecting a current game state is first obtained, and the game screen image is then inputted into the trained deep network. The trained deep network outputs a posterior probability of each action performed in the current game state. In an example, an action to be performed by the character object in the current game state may be selected according to the maximum posterior probability. An action frequency may be 10 actions per second. This is not specifically limited in this embodiment of the present disclosure.

Figure 9:
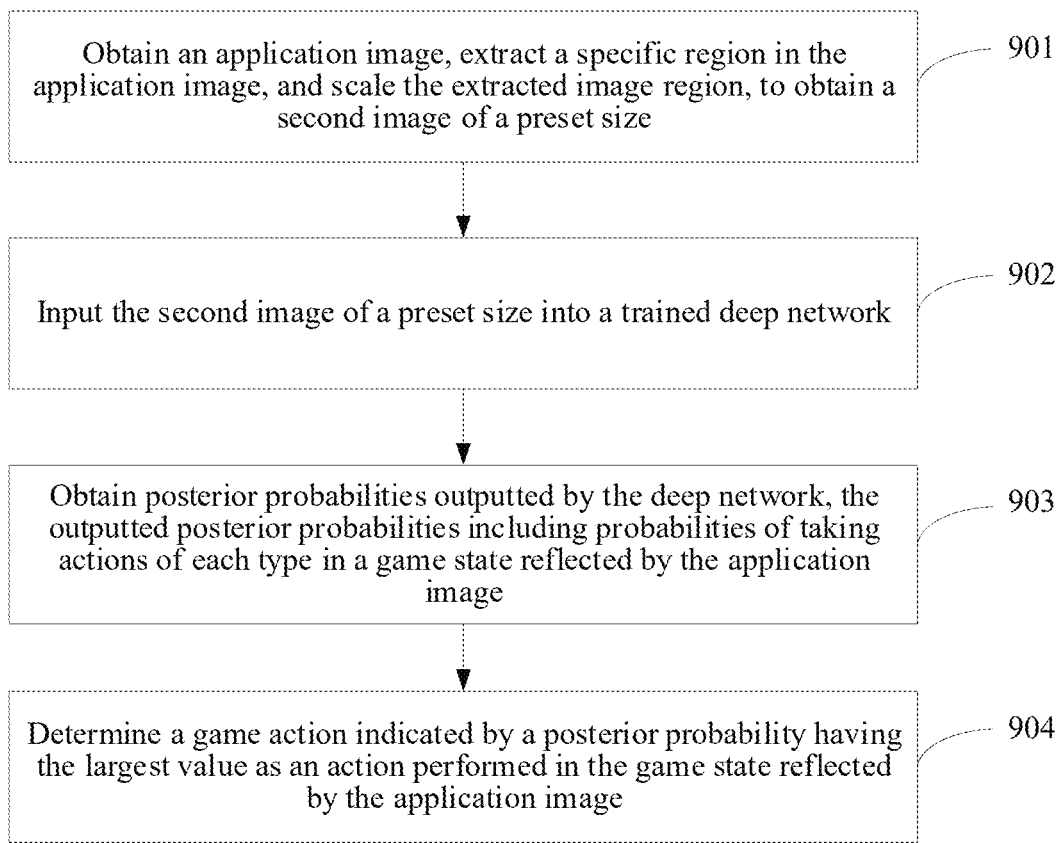
FIG. 9 is a flowchart of a process of applying a model according to an embodiment of the present disclosure.

That is, referring to FIG. 9, the foregoing process may be concluded as the following steps:

901. Obtain an application image, extract a specific region in the application image, and scale the extracted image region, to obtain a second image of a preset size.

In an example, the specific region in the application image may be directly used as the second image.

902. Input the second image of a preset size into a trained deep network.

903. Obtain posterior probabilities outputted by the trained deep network, the outputted posterior probability including probabilities of taking actions of each type in a game state reflected by the application image.

904. Determine a game action indicated by a posterior probability having the largest value as an action performed in the game state reflected by the application image.

In another embodiment, if the trained deep network passes the test, the trained game AI may be deployed on the model application device, so that the model application device can simulate a real player to play a game. That is, the character object is controlled based on the trained game AI to take suitable game actions in different game states. In a game scenario, the model application device performs steps such as steps 901 to 904 described above to select an action for the controlled character object. In addition, introduction scenarios of a game AI include, but are not limited to, a standalone mode (e.g., the user controls a first character object and the AI model controls a second character object, to perform cooperative and/or competitive gaming tasks when executing the game), a custody-requiring mode (e.g., the user switches from controlling a character manually to using the AI model to simulate actions of the user's character for continuous playing), and insufficient player matching (e.g., when a game requires N players but there is only M real user players (M<N), the AI model simulates (N−M) players to control (N−M) character objects to play in the game). This is not specifically limited in this embodiment of the present disclosure.

Figure 10:
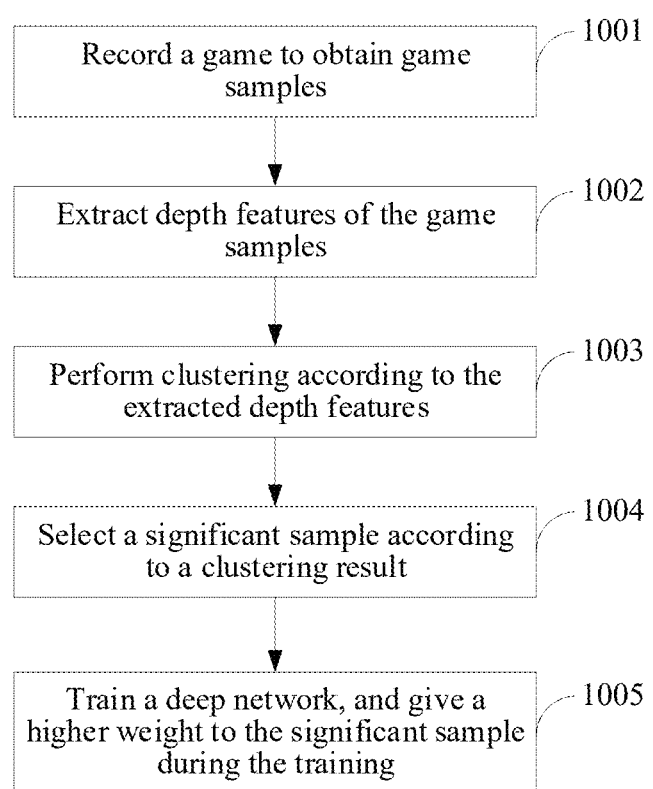
FIG. 10 is an overall execution flowchart of a model training method according to an embodiment of the present disclosure.

In another embodiment, referring to FIG. 10, an overall execution flowchart of a model training method provided in one embodiment of the present disclosure includes the following steps:

1001. Record a game to obtain game samples.

In one embodiment of the present disclosure, different game AIs may be trained for games of different types. It is only necessary to record the games of different types to obtain corresponding game samples for the training. For example, a car racing game corresponds to one game AI, and a parkour game corresponds to another game AI.

1002. Extract depth features of the game samples.

Depth features are abstract features of the game samples. A depth feature of each game sample can be extracted by using the pretrained deep network model.

1003. Perform clustering according to the extracted depth features.

During the clustering, in one embodiment of the present disclosure, a depth feature of a single frame is extracted by using the pretrained deep network model, and clustering is then performed according to the depth features of all the frames by using a K-means algorithm. In addition, time series features of a plurality of frames may also be extracted by using a long short-term memory (LSTM) network, and clustering is performed according to the time series features of the plurality of frames. This is not specifically limited in this embodiment of the present disclosure.

1004. Select a significant sample according to a clustering result.

For this step, reference may be made to the descriptions in the foregoing step 403.

1005. Train a deep network, and give a higher weight to the significant sample during the training.

A network structure of the deep network is shown in FIG. 8. Giving a higher weight means that a weight of the significant sample is greater than a weight of a common sample that is not important.

In another embodiment, because a quantity of recorded game samples is relatively small, and there are more redundancies in the recorded game samples, in order to prevent overfitting of the trained deep network, regularization loss may further be added to a loss function of the deep network to prevent the network parameter from becoming excessively complex. The meaning of overfitting is to overfit training data without considering a generalization ability. A network trained in such a manner performs well on a training set, but performs poorly on a test set. For this purpose, regularization is used in one embodiment of the present disclosure, which is to add a penalty item (a weight), that is, a regularization item, to the loss function, so as to reduce the impact of a result of the test on an entire result.

The steps in the embodiments of the present disclosure are not necessarily performed according to a sequence indicated by step numbers. Unless otherwise explicitly specified in the present disclosure, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with other steps or at least some of sub-steps or stages of other steps.

In another embodiment, because a quantity of recorded game samples is relatively small, the quantity of samples may be increased to prevent overfitting. In a possible implementation, the quantity of samples for training a game AI may be increased by randomly cropping or scaling the recorded game samples. This is not specifically limited in this embodiment of the present disclosure.

Figure 11:
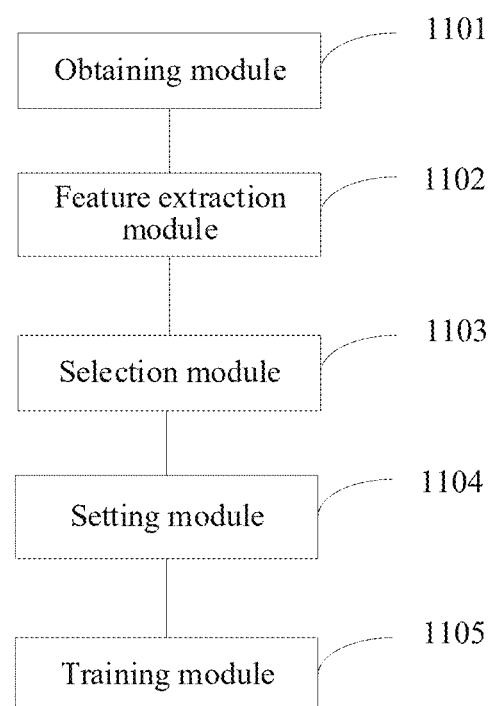
FIG. 11 is a schematic structural diagram of a model training apparatus according to an embodiment of the present disclosure.

FIG. 11 is a schematic structural diagram of a model training apparatus according to an embodiment of the present disclosure. Referring to FIG. 11, the apparatus includes:

an obtaining module 1101, configured to obtain a plurality of training samples, each training sample including an interaction screen and an action label, the action label indicating an interaction action adopted by a character object in the interaction screen;

a feature extraction module 1102, configured to: extract features from the interaction screens included in the plurality of training samples, and perform clustering according to the extracted features;

a selection module 1103, configured to determine at least one key sample from the plurality of training samples according to an obtained clustering result;

a setting module 1104, configured to set a weight for each training sample; and a training module 1105, configured to update a network parameter of a deep network based on the plurality of training samples with the weights, the weight of each key sample being greater than the weight of another sample in the plurality of training samples.

By using the apparatus provided in one embodiment of the present disclosure, during the training of an AI model, a currently displayed interaction process is first recorded to obtain the training samples. Subsequently, the features are extracted from the interaction screens included in the plurality of training samples, and clustering is performed according to the extracted features. Subsequently, the key sample is selected according to the clustering result, and the key sample is a sample corresponding to an interaction screen in which a character object needs to perform a specific interaction action. Subsequently, a weight is set for each training sample. The principle of the setting is that the weight of the key sample is greater than the weight of another sample. The network parameter of the deep network is further updated based on the training samples with the weights. It can be learned from the foregoing description that, in one embodiment of the present disclosure, a key sample corresponding to a key moment in an interaction process can be selected based on the clustering result, and a higher weight is given to the key sample during the training, to make the weight of the key sample higher than that of another sample, so that the impact of the key sample on the network parameter can be enhanced and the impact of other samples with lower significance on the network parameter can be reduced, thereby achieving a better AI model training effect.

In a possible implementation, the plurality of training samples are clustered into at least two types according to the clustering result.

The selection module 1103 is further configured to: count a quantity of action labels included in each of the at least two types; and determine, for any type, a training sample corresponding to the type as the key sample when the quantity of action labels included in the type is less than a first threshold.

In a possible implementation, the setting module 1104 is further configured to determine, for any type, the reciprocal of the quantity of action labels included in the type as the weight of the training sample corresponding to the type.

In a possible implementation, the obtaining module 1101 is further configured to: record the currently displayed interaction process based on a target duration to obtain initial samples; and resample the initial samples to obtain the plurality of training samples,
- a sample quantity corresponding to each interaction action in the plurality of training samples being greater than a second threshold.

In a possible implementation, the training module 1105 is further configured to: extract, for any training sample, a specific region in the interaction screen included in the training sample, and scale the extracted image region, to obtain a first image of a preset size; input the first image into the deep network to obtain an action prediction result outputted by the deep network; determine, based on a loss function corresponding to the training sample, whether the interaction action indicated by the action label included in the training sample matches an estimated action provided by the action prediction result; and iteratively update the network parameter of the deep network continuously when the interaction action indicated by the action label does not match the estimated action, until the deep network converges.

In a possible implementation, the loss function corresponding to the training sample is as follows:

$$loss = w \sum_{i=1}^{C} y_i \log(\hat{y}_i),$$

where w indicates a weight of the training sample, C indicates a total quantity of interaction actions, i indicates an action type, the value of i is 1 to C, $y_i$ indicates whether the interaction action indicated by the action label is of an $i^{th}$ type, $\hat{y}_i$ indicates a posterior probability that is outputted by the deep network and is of performing an action of the $i^{th}$ type in the interaction screen included in the training sample, the value of w is 0 to 1, and the value of C is a positive integer.

In a possible implementation, the apparatus further includes:
- an obtaining module, configured to obtain an application image;
- the feature extraction module, further configured to extract a specific region in the application image;
- a processing module, configured to: scale the extracted image region, to obtain a second image of a preset size, and input the second image into a trained deep network; and
- a determining module, configured to: obtain posterior probabilities outputted by the trained deep network, the posterior probability including probabilities of taking actions of each type in an interaction status reflected by the application image; and determine an interaction action indicated by a posterior probability having the largest value as an action performed in the interaction status reflected by the application image.

Any combination of the foregoing technical solutions may be used to form an embodiment of the present disclosure. Details are not described herein again.

When the model training apparatus according to the foregoing embodiment performs model training, division of the foregoing functional modules is merely an example for descriptions. During actual application, the foregoing functions may be allocated to and completed by different functional modules according to requirements. That is, the internal structure of the apparatus is divided into different functional modules, to complete all or some of the foregoing described functions. In addition, the model training apparatus and model training method embodiments provided in the foregoing embodiments belong to one conception. For the specific implementation process, reference may be made to the method embodiments, and details are not described herein again.

Figure 12:
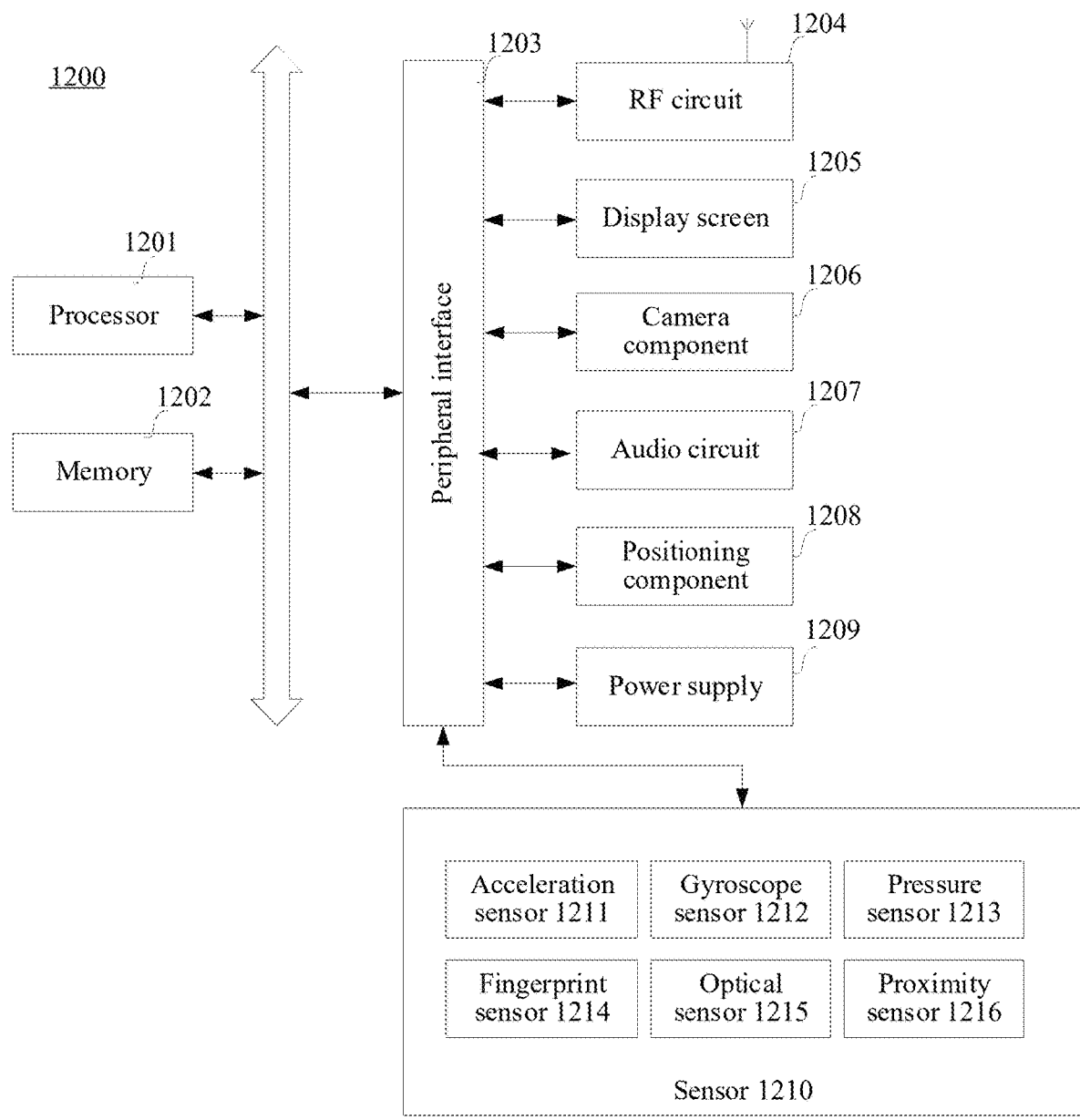
FIG. 12 is a schematic structural diagram of a model training device according to an embodiment of the present disclosure.

FIG. 12 is a structural block diagram of a model training device 1200 according to an exemplary embodiment of the present disclosure. The device 1200 may be a mobile terminal, for example, a smartphone or a tablet computer.

Generally, the device 1200 includes a processor 1201 and a memory 1202.

The processor 1201 may include one or more processing cores, and may be, for example, a 4-core processor or an 8-core processor. The processor 1201 may be implemented in at least one hardware form of a digital signal processor (DSP), a field-programmable gate array (FPGA), and a programmable logic array (PLA). The processor 1201 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1201 may be integrated with a graphics processing unit (GPU). The GPU is configured to render and draw content that needs to be displayed on a display. In some embodiments, the processor 1201 may further include an AI processor. The AI processor is configured to process computing operations related to ML.

The memory 1202 may include one or more computer-readable storage media. The computer-readable storage medium may be non-transient. The memory 1202 may further include a high-speed random access memory, and a non-volatile memory such as one or more magnetic disk storage devices and a flash memory device. In some embodiments, the non-transitory computer-readable storage medium in the memory 1202 is configured to store at least one instruction, the at least one instruction being configured to be executed by the processor 1201 to perform the model training method provided in the method embodiments of the present disclosure.

In some embodiments, the device 1200 may include: a peripheral interface 1203 and at least one peripheral. The processor 1201, the memory 1202, and the peripheral interface 1203 may be connected by a bus or a signal line. Each peripheral may be connected to the peripheral interface 1203 by using a bus, a signal cable, or a circuit board. Specifically, the peripheral includes: at least one of a radio frequency (RF) circuit 1204, a display screen 1205, a camera component 1206, an audio circuit 1207, a positioning component 1208, and a power supply 1209.

The peripheral interface 1203 may be configured to connect the at least one peripheral related to input/output (I/O) to the processor 1201 and the memory 1202. In some embodiments, the processor 1201, the memory 1202, and the peripheral interface 1203 are integrated on the same chip or circuit board. In some other embodiments, any one or two of the processors 1201, the memory 1202, and the peripheral interface 1203 may be implemented on a separate chip or circuit board. This is not limited in this embodiment.

The RF circuit 1204 is configured to receive and transmit an RF signal, also referred to as an electromagnetic signal. The RF circuit 1204 communicates with a communication network and another communication device by using the electromagnetic signal. The RF circuit 1204 converts an electric signal into an electromagnetic signal for transmission, or converts a received electromagnetic signal into an electric signal. In one embodiment, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with other terminals by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF 1204 may further include a circuit related to NFC, which is not limited in the present disclosure.

The display screen 1205 is configured to display a user interface (UI). The UI may include a graph, text, an icon, a video, and any combination thereof. When the display screen 1205 is a touch display screen, the display screen 1205 is also capable of acquiring a touch signal on or above a surface of the display screen 1205. The touch signal may be inputted into the processor 1201 as a control signal for processing. In this case, the display screen 1205 may be further configured to provide a virtual button and/or a virtual keyboard, also referred to as a soft button and/or a soft keyboard. In some embodiments, there may be one display screen 1205 disposed on a front panel of the device 1200. In some other embodiments, there may be at least two display screens 1205 respectively disposed on different surfaces of the device 1200 or designed in a foldable shape. In still some other embodiments, the display screen 1205 may be a flexible display screen disposed on a curved surface or a folded surface of the device 1200. The display screen 1205 may further be set to have a non-rectangular irregular graph, that is, a special-shaped screen. The display screen 1205 may be prepared by using materials such as a liquid crystal display (LCD), an organic light-emitting diode (OLED), or the like.

The camera component 1206 is configured to acquire an image or a video. In one embodiment, the camera component 1206 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera component 1206 may further include a flash. The flash may be a single color temperature flash or a double color temperature flash. The double color temperature flash is a combination of a warm light flash and a cold light flash, and may be used for light compensation under different color temperatures.

The audio circuit 1207 may include a microphone and a speaker. The microphone is configured to acquire sound waves of users and surroundings, and convert the sound waves into electrical signals and input the signals to the processor 1201 for processing, or input the signals to the RF circuit 1204 to implement voice communication. For stereo acquisition or noise reduction, there may be a plurality of microphones that are respectively disposed at different portions of the device 1200. The microphone may be alternatively a microphone array or an omnidirectional acquisition microphone. The speaker is configured to convert electrical signals from the processor 1201 or the RF circuit 1204 into sound waves. The speaker may be a thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging and the like. In some embodiments, the audio circuit 1207 may also include an earphone jack.

The positioning component 1208 is configured to determine a current geographical position of the device 1200, to implement navigation or a location based service (LBS). The positioning component 1208 may be a positioning component based on the global positioning system (GPS) of the United States, the BeiDou System of China, and the GALILEO System of Russia.

The power supply 1209 is configured to supply power to assemblies in the device 1200. The power supply 1209 may be an alternating current, a direct current, a primary battery, or a rechargeable battery. When the power supply 1209 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charge technology.

In some embodiments, the device 1200 may also include one or more sensors 1210. The one or more sensors 1210 include, but are not limited to, an acceleration sensor 1211, a gyroscope sensor 1212, a pressure sensor 1213, a fingerprint sensor 1214, an optical sensor 1215, and a proximity sensor 1216.

The acceleration sensor 1211 may detect acceleration on three coordinate axes of a coordinate system established by using the device 1200. For example, the acceleration sensor 1211 may be configured to detect components of gravity acceleration on the three coordinate axes. The processor 1201 may control, according to a gravity acceleration signal acquired by the acceleration sensor 1211, the display screen 1205 to display the user interface in a frame view or a portrait view. The acceleration sensor 1211 may be further configured to acquire motion data of a game or a user.

The gyro sensor 1212 may detect a body direction and a rotation angle of the device 1200, and the gyro sensor 1212 may cooperate with the acceleration sensor 1211 to acquire a 3D action performed by a user on the device 1200. The processor 1201 may implement the following functions according to the data acquired by the gyroscope sensor 1212: motion sensing (such as changing the UI according to a tilt operation of the user), image stabilization at shooting, game control, and inertial navigation.

The pressure sensor 1213 may be disposed at a side frame of the device 1200 and/or a layer under the touch display screen 1205. When the pressure sensor 1213 is disposed at the side frame of the device 1200, a grip signal of the user on the device 1200 may be detected, and the processor 1201 may perform left-right hand recognition or a shortcut operation according to the grip signal acquired by the pressure sensor 1213. When the pressure sensor 1213 is disposed on the low layer of the touch display screen 1205, the processor 1201 controls, according to a pressure operation of the user on the display screen 1205, an operable control on the UI. The operable control includes at least one of a button control, a scroll-bar control, an icon control, and a menu control.

The fingerprint sensor 1214 is configured to acquire a fingerprint of a user, and the processor 1201 recognizes an identity of the user according to the fingerprint acquired by the fingerprint sensor 1214, or the fingerprint sensor 1214 recognizes the identity of the user based on the acquired fingerprint. When the identity of the user is identified as a trusted identity, the processor 1201 authorizes the user to perform a related sensitive operation. The sensitive operation includes unlocking a screen, viewing encrypted information, downloading software, payment, changing settings, and the like. The fingerprint sensor 1214 may be disposed at the front, the back, or the side of the device 1200. When a physical button or a manufacturer logo is disposed on the device 1200, the fingerprint sensor 1214 may be integrated with the physical button or the manufacturer logo.

The optical sensor 1215 is configured to acquire ambient light intensity. In an embodiment, the processor 1201 may control display brightness of the display screen 1205 according to the ambient light intensity acquired by the optical sensor 1215. Specifically, when the ambient light intensity is relatively high, the display luminance of the display screen 1205 is increased. When the ambient light intensity is relatively low, the display luminance of the display screen 1205 is reduced. In another embodiment, the processor 1201 may further dynamically adjust a camera parameter of the camera assembly 1206 according to the ambient light intensity acquired by the optical sensor 1215.

The proximity sensor 1216, also referred to as a distance sensor, is usually disposed on the front panel of the device 1200. The proximity sensor 1216 is configured to acquire a distance between the user and the front of the device 1200. In an embodiment, when the proximity sensor 1216 detects that the distance between the user and the front surface of the device 1200 becomes smaller, the touch display screen 1205 is controlled by the processor 1201 to switch from a screen-on state to a screen-off state. When the proximity sensor 1216 detects that the distance between the user and the front surface of the device 1200 becomes larger, the touch display screen 1205 is controlled by the processor 1201 to switch from the screen-off state to the screen-on state.

A person skilled in the art may understand that the structure shown in FIG. 12 does not constitute a limitation to the device 1200, and the electronic device may include more components or fewer components than those shown in the figure, or some components may be combined, or a different component deployment may be used.

Figure 13:
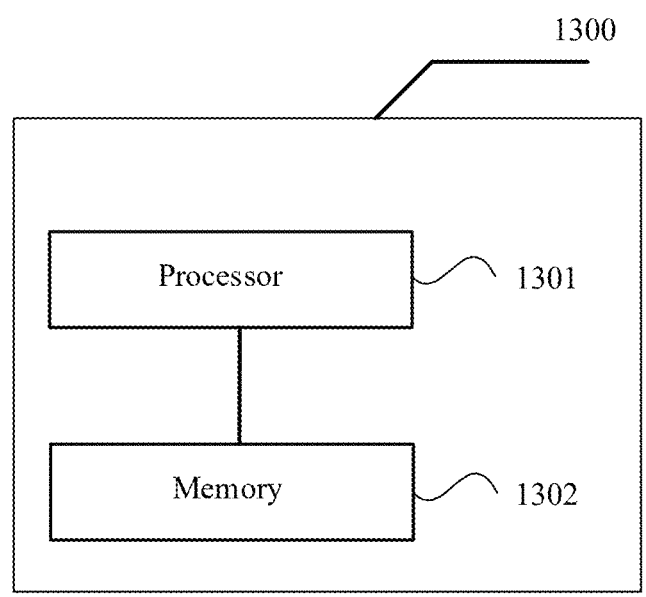
FIG. 13 is a schematic structural diagram of another model training device according to an embodiment of the present disclosure.

FIG. 13 is a schematic structural diagram of another model training device according to an embodiment of the present disclosure. The device 1300 may vary greatly due to different configurations or performance, and may include one or more processors (such as central processing units (CPUs)) 1301 and one or more memories 1302. The memory 1302 stores at least one instruction, the at least one instruction being loaded and executed by the processor 1301 to perform the model training method provided in the foregoing method embodiments. Certainly, the device may further have components such as a wired or wireless network interface, a keyboard, and an input/output interface for inputting and outputting. The device may further include other components for implementing device functions. Details are not described herein.

In an exemplary embodiment, a computer-readable storage medium, for example, a memory including instructions, is further provided. The instructions may be executed by the processor in the device to implement the model training method in the foregoing embodiment. For example, the computer-readable storage medium may be a ROM, a random access memory (RAM), a CD-ROM, a magnetic tape, a floppy disk, an optical data storage device, or the like.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of the present disclosure, and are not intended to limit the present disclosure. Any modification, equivalent replacement, improvement, and the like made within the spirit and principle of the present disclosure shall fall within the protection scope of the present disclosure.

What is claimed is:

1. A model training method, performed by a computer device, the method comprising:
    obtaining a plurality of training samples, each training sample comprising an interaction screen and an action label, the action label indicating an interaction action adopted by a character object in the interaction screen;
    extracting features from interaction screens comprised in the plurality of training samples, and performing clustering according to the extracted features, to obtain a clustering result;
    determining at least one key sample from the plurality of training samples according to the clustering result; and
    setting a weight for each training sample, and updating a network parameter of a deep network based on the plurality of training samples with the weights, the weight of each key sample being greater than the weight of another sample in the plurality of training samples;
    wherein updating the network parameter of the deep network based on the plurality of training samples with the weights comprises:
        obtaining, for a training sample, a first image corresponding to a specific region in the interaction screen comprised in the training sample;
        inputting the first image into the deep network to obtain an action prediction result outputted by the deep network;
        determining, based on a loss function corresponding to the training sample, whether the interaction action indicated by the action label comprised in the training sample matches an estimated action provided by the action prediction result; and
        iteratively updating the network parameter of the deep network when the interaction action indicated by the action label does not match the estimated action, until the deep network converges.

2. The method according to claim 1, wherein the plurality of training samples are clustered into at least two types according to the clustering result, and the determining at least one key sample from the plurality of training samples according to the clustering result comprises:
    counting a quantity of action labels comprised in each of the at least two types; and
    determining, for a type, a training sample corresponding to the type as the key sample when the quantity of action labels comprised in the type is less than a first threshold.

3. The method according to claim 1, wherein the plurality of training samples are clustered into at least two types according to the clustering result, and the setting a weight for each training sample comprises:

counting a quantity of action labels comprised in each of the at least two types; and determining, for a type, a weight of a training sample corresponding to the type according to the quantity of action labels comprised in the type, the quantity of action labels comprised in the type being negatively correlated with the weight.

4. The method according to claim 3, wherein the determining a weight of a training sample corresponding to the type according to the quantity of action labels comprised in the type comprises:

determining a reciprocal of the quantity of action labels comprised in the type as the weight of the training sample corresponding to the type.

5. The method according to claim 1, wherein the obtaining a plurality of training samples comprises:

recording a currently displayed interaction process during running of a target interaction program, to obtain the plurality of training samples.

6. The method according to claim 5, wherein the recording a currently displayed interaction process to obtain the plurality of training samples comprises:

recording the currently displayed interaction process based on a target duration to obtain initial samples; and resampling the initial samples to obtain the plurality of training samples, a sample quantity corresponding to each interaction action in the plurality of training samples being greater than a second threshold.

7. The method according to claim 1, wherein the loss function corresponding to the training sample is as follows:

$$loss = w \sum_{i=1}^{C} y_i \log(\hat{y}_i),$$

wherein w indicates the weight of the training sample, C indicates a total quantity of interaction actions comprised in the training sample, i indicates an action type and ranges from 1 to C, $y_i$ indicates whether the interaction action indicated by the action label is of an $i^{th}$ type, $\hat{y}_i$ indicates a posterior probability that is outputted by the deep network and is of performing an action of the $i^{th}$ type in the interaction screen comprised in the training sample, w ranges from 0 to 1, and C is a positive integer.

8. The method according to claim 1, further comprising:

obtaining an application image, extracting a second image corresponding to a specific region in the application image, and inputting the second image into a trained deep network;

obtaining posterior probabilities outputted by the trained deep network, the posterior probabilities comprising probabilities of taking actions of each type in an interaction status reflected by the application image; and determining an interaction action indicated by a posterior probability having the largest value as an action performed in the interaction status reflected by the application image.

9. A computer device, comprising a memory and a processor, the memory storing computer-readable instructions, the computer-readable instructions, when executed by the processor, causing the processor to perform:

obtaining a plurality of training samples, each training sample comprising an interaction screen and an action label, the action label indicating an interaction action adopted by a character object in the interaction screen;

extracting features from interaction screens comprised in the plurality of training samples, and performing clustering according to the extracted features, to obtain a clustering result;

determining at least one key sample from the plurality of training samples according to the clustering result; and setting a weight for each training sample, and updating a network parameter of a deep network based on the plurality of training samples with the weights, the weight of each key sample being greater than the weight of another sample in the plurality of training samples;

wherein updating the network parameter of the deep network based on the plurality of training samples with the weights comprises:

obtaining, for a training sample, a first image corresponding to a specific region in the interaction screen comprised in the training sample;

inputting the first image into the deep network to obtain an action prediction result outputted by the deep network;

determining, based on a loss function corresponding to the training sample, whether the interaction action indicated by the action label comprised in the training sample matches an estimated action provided by the action prediction result; and iteratively updating the network parameter of the deep network when the interaction action indicated by the action label does not match the estimated action, until the deep network converges.

10. The computer device according to claim 9, wherein the plurality of training samples are clustered into at least two types according to the clustering result, and the determining at least one key sample from the plurality of training samples according to the clustering result comprises:

counting a quantity of action labels comprised in each of the at least two types; and determining, for a type, a training sample corresponding to the type as the key sample when the quantity of action labels comprised in the type is less than a first threshold.

11. The computer device according to claim 9, wherein the plurality of training samples are clustered into at least two types according to the clustering result, and the setting a weight for each training sample comprises:

counting a quantity of action labels comprised in each of the at least two types; and determining, for a type, a weight of a training sample corresponding to the type according to the quantity of action labels comprised in the type, the quantity of action labels comprised in the type being negatively correlated with the weight.

12. The computer device according to claim 11, wherein the determining a weight of a training sample corresponding to the type according to the quantity of action labels comprised in the type comprises:

determining a reciprocal of the quantity of action labels comprised in the type as the weight of the training sample corresponding to the type.

13. The computer device according to claim 9, wherein the obtaining a plurality of training samples comprises:

recording a currently displayed interaction process during running of a target interaction program, to obtain the plurality of training samples.

14. The computer device according to claim 13, wherein the recording a currently displayed interaction process to obtain the plurality of training samples comprises:
  recording the currently displayed interaction process based on a target duration to obtain initial samples; and
  resampling the initial samples to obtain the plurality of training samples,
  a sample quantity corresponding to each interaction action in the plurality of training samples being greater than a second threshold.

15. The computer device according to claim 9, wherein the loss function corresponding to the training sample is as follows:

$$loss = w \sum_{i=1}^{C} y_i \log(\hat{y}_i),$$

wherein w indicates the weight of the training sample, C indicates a total quantity of interaction actions comprised in the training sample, i indicates an action type and ranges from 1 to C, $y_i$ indicates whether the interaction action indicated by the action label is of an $i^{th}$ type, $\hat{y}_i$ indicates a posterior probability that is outputted by the deep network and is of performing an action of the $i^{th}$ type in the interaction screen comprised in the training sample, w ranges from 0 to 1, and C is a positive integer.

16. The computer device according to claim 9, wherein the computer-readable instructions further cause the processor to perform:
  obtaining an application image, extracting a second image corresponding to a specific region in the application image, and inputting the second image into a trained deep network;
  obtaining posterior probabilities outputted by the trained deep network, the posterior probabilities comprising probabilities of taking actions of each type in an interaction status reflected by the application image; and
  determining an interaction action indicated by a posterior probability having the largest value as an action performed in the interaction status reflected by the application image.

17. One or more non-transitory storage media storing computer-readable instructions, the computer-readable instructions, when executed by one or more processors, causing the one or more processors to perform:
  obtaining a plurality of training samples, each training sample comprising an interaction screen and an action label, the action label indicating an interaction action adopted by a character object in the interaction screen;
  extracting features from interaction screens comprised in the plurality of training samples, and performing clustering according to the extracted features, to obtain a clustering result;
  determining at least one key sample from the plurality of training samples according to the clustering result; and
  setting a weight for each training sample, and updating a network parameter of a deep network based on the plurality of training samples with the weights, the weight of each key sample being greater than the weight of another sample in the plurality of training samples;
  wherein updating the network parameter of the deep network based on the plurality of training samples with the weights comprises:
    obtaining, for a training sample, a first image corresponding to a specific region in the interaction screen comprised in the training sample;
    inputting the first image into the deep network to obtain an action prediction result outputted by the deep network;
    determining, based on a loss function corresponding to the training sample, whether the interaction action indicated by the action label comprised in the training sample matches an estimated action provided by the action prediction result; and
    iteratively updating the network parameter of the deep network when the interaction action indicated by the action label does not match the estimated action, until the deep network converges.

18. The storage media according to claim 17, wherein the plurality of training samples are clustered into at least two types according to the clustering result, and the determining at least one key sample from the plurality of training samples according to the clustering result comprises:
  counting a quantity of action labels comprised in each of the at least two types; and
  determining, for a type, a training sample corresponding to the type as the key sample when the quantity of action labels comprised in the type is less than a first threshold.

* * * * *